OMNIDIRECTIONAL ANTENNA ARRAY WITH PHASE SHIFTED FEED HAVING A DESIGN FREQUENCY ABOVE MIDBAND FREQUENCY

Filed Sept. 24, 1963 2 Sheets-Sheet 1

United States Patent Office 3,307,195 Patented Feb. 28, 1967

3,307,195
OMNIDIRECTIONAL ANTENNA ARRAY WITH PHASE SHIFTED FEED HAVING A DESIGN FREQUENCY ABOVE MIDBAND FREQUENCY

Helmut Laub, Munich, Germany, assignor to Siemens & Halske Aktiengesellschaft, Berlin and Munich, a corporation of Germany Filed Sept. 24, 1963, Ser. No. 311,037
Claims priority, application Germany, Oct. 4, 1962, S 81,887
8 Claims. (Cl. 343—799)

Figure 1:
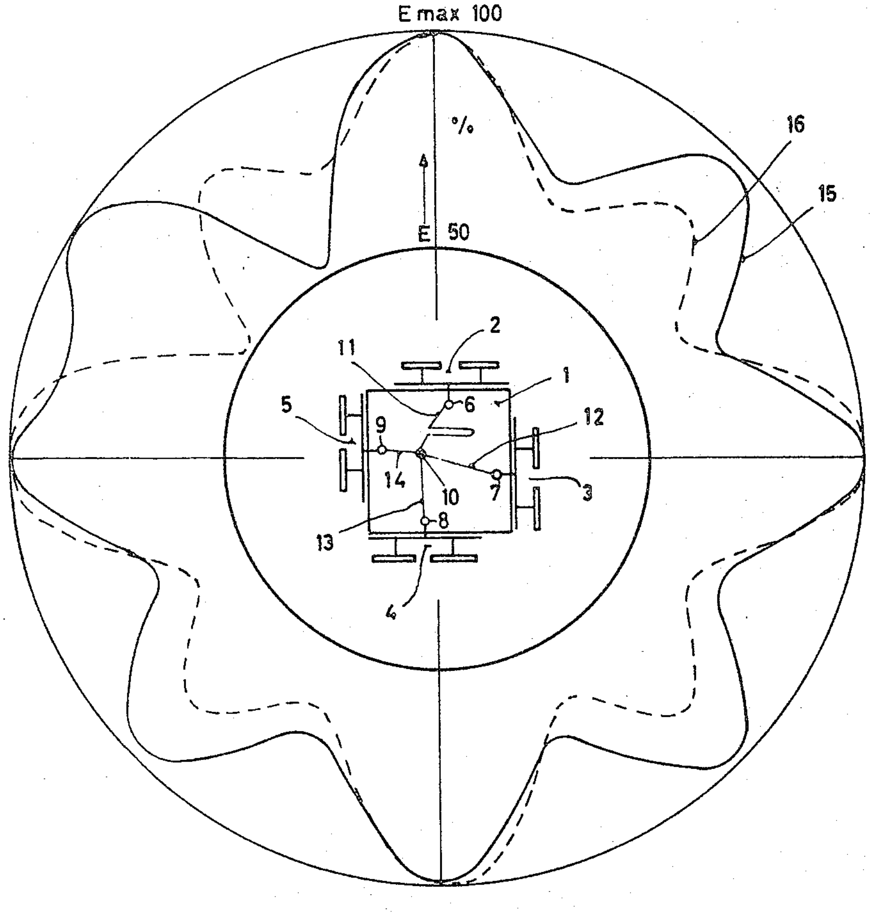

The invention disclosed herein is concerned with an antenna arrangement comprising radiators or radiator groups which are fed in rotary field.

It is known to feed in rotary field a plurality of $n$ radiators or radiator groups of an omnidirectional antenna arrangement, with a phase step in the order of $360/n$ degrees obtaining between the individual radiators. This mode of feeding makes it possible to obtain an improvement with respect to the matching, since there results upon alteration of the base-point resistance of the radiator elements, oppositely phased reactions which operate to a large extent in mutually cancelling manner. The radiator elements are in known manner correspondingly spatially displaced or staggered so as to compensate for the alteration of the radiation diagram caused by the different feed phases. The laying out of the phase step of $360/n$ degrees and the spatial staggering can be accurately carried out only for a very definite frequency, while difficulties with respect to the uniformity of the radiation diagram appear as a result of deviation from this frequency. The transmission of an extended frequency band is customarily based on a wave length, for the dimensioning of the phase step and for the spatial displacement of the radiator elements, which corresponds to the arithmetic average from the two range-defining frequencies of the band which is to be transmitted. Since the phase differences are as a rule produced by cable portions of different length, the length-differences of these cable portions are likewise referred to the wave length corresponding to the center frequency.

The object underlying the invention resides primarily in forming the radiation diagrams of radiators or radiator groups which are fed in rotary field, more uniform for a wide band operation.

According to the invention, this object is realized, in connection with an antenna arrangement comprising $n$ radiators or radiator groups fed in rotary field, by the provision, upon transmission of a band lying between the range-finding frequencies $f_1$ and $f_2$, of a phase step, between neighboring radiators or radiator groups, which deviates at the center frequency $$f_m=\frac{f_1+f_2}{2}$$

from $360/n$ degrees and which is equally great for all neighboring radiators only at a frequency $f_0$, lying within the range-finding frequency, which is greater than $f_m$. While an optimum layout of the antenna arrangement is to be expected when the phase step reaches, at the center frequency of the band to be transmitted, its predetermined value of $360/n$ degrees, it was surprisingly found that a more uniform radiation diagram can be obtained for wide band transmission when the frequency, which is decisive for the phase step, lies above the center frequency.

The frequency $f_0$ for which the phase step accurately reaches the desired value of $360/n$ degrees, can be advantageously determined by the equation $$f_0=f_m\cdot(1+b/k)$$

$$b=\frac{f_2-f_1}{f_2+f_1}$$

and $k$ corresponds to a parameter with a value lying between 3 and 10. This parameter is dependent particularly upon the number $n$ of the radiators or radiator groups, with dimensions referred to the average wave length $\lambda m$ of the omnidirectional unit formed by the $n$ radiators or radiator groups as well as the radiation diagram of the individual radiator or the individual radiator group.

Upon using cable portions extending from a common distributor point and having, for the production of the phase step between the radiator elements, different lengths, the electrical length of the cables is selected smaller than $\lambda m/n$, wherein $\lambda m$ represents the average wave length. It is moreover advantageous to adjust phase steps of 180° and more, by changing polarization of the lines together with line portions of corresponding length, resulting in a greater rounding of the radiation diagram.

An improvement in the uniformity of the radiation diagram for wide band operation of an antenna arrangement fed in rotary field, may be additionally obtained by a structure wherein the principal radiation directions of those of the radiators between which the phase step increases with increasing frequency, mutually embrace a larger angle than the principal radiation directions of radiators between which the phase step decreases with increasing frequency.

Another possibility of obtaining a more uniform radiation diagram for wide band operation resides in carrying out a spatial displacement of the radiators, serving for the compensation of disturbances of the radiation diagram caused by the different phase, so that the spacing between the points of radiation concentration of those radiators between which the phase step increases with increasing frequency, is greater than that between radiators operating at increasing frequency with a smaller phase step.

It is moreover advantageous to refer the spatial displacement of the radiators, which serves for the compensation of the disturbances of the radiation diagram, caused by the different phase, to a wave length which corresponds to a frequency lying above the center frequency of the frequency band to be transmitted.

Further features and details of the invention will appear from the appended claims and from the description of embodiments which is rendered below with reference to the accompanying drawing.

Figure 2:
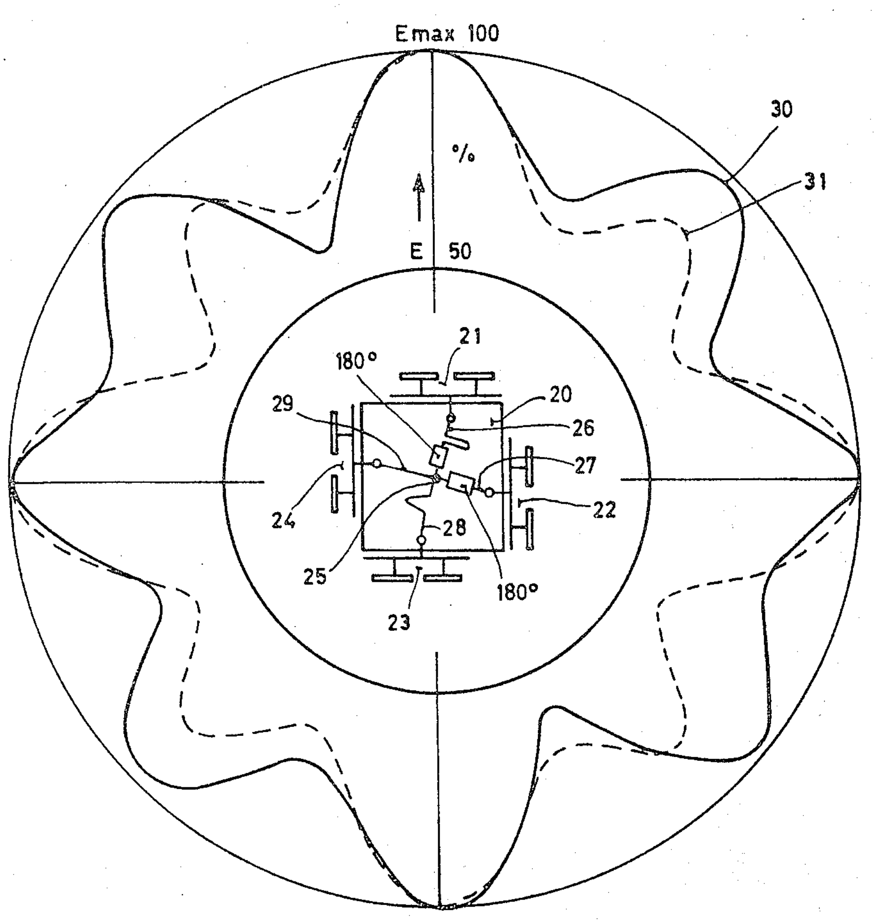

FIG. 1 shows an example of an antenna arrangement operating in the decimeter wave range and comprising four radiators or radiator groups, respectively, together with the corresponding radiation diagram; and FIG. 2 shows as an example another embodiment.

Referring now to FIG. 1, numeral 1 indicates a mast on which are disposed full wave dipoles 2, 3, 4 and 5 which are with their reflectors combined to form a fixed structural unit. Instead of using individual dipoles, there may be advantageously employed a plurality of dipoles which are combined in vertical direction so as to obtain greater focusing sharpness, thus resulting in so-called dipole fields. The individual radiators or radiator groups are provided with respective terminal points 6 to 9 to which are connected feed lines 11 to 14 extending from a common distributor 10. The length of these feed lines is so selected that there obtains, proceeding from the line 11, a difference in length amounting to $\lambda/4$, and a phase step amounting, with $n=4$ radiator elements, to 90°. Thus, upon assigning to the radiator 2 the phase of 0°, there will result for the radiator 3 a phase of +90°, for the radiator 4 a phase of 180°, and for the radiator 5 a phase of +270°.

The radiation distribution resulting at a spacing between the respective points of radiation concentration of the individual radiators on the order of $\lambda m$ (average wave length), is shown for the frequency $f=0.85f_m$ as a full line 15 and for the frequency $f=1.15f_m$ as a dash line 16. In such case, the field strength E does not drop below the value 0.5 $E_{max}$. It is assumed, however, that the frequency at which the phase step reaches the value 90°, is greater than the center frequency (arithmetic average) $f_m$. The frequency $f_0$, at which the phase step reaches exactly 90°, lies at about 1.06 $f_m$; expressed in other words, this means, that the phase step for the frequency $f_m$ between the radiation elements 2 and 3, 3 and 4 and 4 and 5 amounts respectively only to 85°, while there appears between the radiator elements 5 and 2, a phase step of 105°. The radiation distribution which would result upon layout of the phase step referred to the center frequency $f_m$, would in the illustrated mode of feed have, upon transmission of a frequency band between 0.85 and 1.15 $f_m$, maximum breaks up to a field strength $E=0.4E_{max}$. It is thus possible to obtain a uniform wide band radiation diagram despite the non-uniform layout with respect to the center frequency. According to the increased phase step between the radiators 5 and 2, there will also result for the field strength course, the deepest breaks between these radiators. The respective radiators or radiator groups 2 to 5 are for the compensation of the variations of the radiation diagram, caused by the different phase, displaced about the mast by an amount, such that superposition, of the individual radiations, with the same phase, is obtained in the range of the angle halves between the principal radiation directions of the individual radiators, i.e., the respective lines bisecting the angles between adjacent principle radiation directions.

FIG. 2 shows the radiation diagram of an antenna arrangement wherein such a one-sided deep break is avoided. On the mast 20 is fastened an antenna arrangement comprising four radiator elements 21 to 24 which are fed in rotary field from a distributor point 25. The cable portions 26 and 28 are of the same length, differing from the cable portions 27 and 29 by the value $\lambda_0/4$, whereby $\lambda_0$ corresponds to a frequency $f_0$ which lies above the center frequency $f_m$. In order to obtain the required phase steps, the feed lines or terminal points, respectively, of the radiator elements 21 and 22 are changed in polarity, which is indicated by the boxes marked 180°. Referred to the center frequency $f_m$, there is obtained a phase of 0° for the radiator element 21, a phase of +85° for the radiator element 22, a phase of 180° for the radiator element 23, and a phase of 180°+85° for the radiator element 24. The corresponding radiation distribution is shown as a full line 30 for $f=0.5$ $f_m$ and as a dash line 31 for the frequency $f=1.15$ $f_m$. The deep break appearing in FIG. 1 between the radiator elements 5 and 2 is largely eliminated. The field strength drops at a maximum only to about $0.6E_{max}$, while the deepest break extends upon transmission of the same frequency band and layout of the phase steps to the center frequency $f_m$, down to about $0.5E_{max}$.

Changes may be made within the scope and spirit of the appended claims which define what is believed to be new and desired to have protected by Letters Patent.

I claim:

1. An antenna arrangement having $n$ radiators fed in rotary field, thereby characterized that upon transmission of a band lying between the range-defining frequencies $f_1$ and $f_2$, the phase step between neighboring radiators deviates, at the center frequency $$fm=\frac{f_1+f_2}{2}$$

and immediately adjacent frequencies from $360/n$ degrees, the improvement therein comprising means for dimensioning and providing an equally great phase step between neighboring radiators only at a frequency $f_0$, lying within the range-defining frequencies, which is substantially higher than $f_m$ and substantially higher than the immediately adjacent frequencies to $f_m$.

2. An antenna arrangement according to claim 1, thereby characterized that the frequency $f_0$, lying above the center frequency $f_m$, is determined by the equation $f_0=f_m(1+b/k)$, wherein $$b=2\frac{f_2-f_1}{f_2+f_1}$$

and wherein $k$ corresponds to a parameter lying between the values 3 and 10.

3. An antenna arrangement according to claim 1, comprising feed cable portions of different lengths, extending to the respective radiators from a common distributor point, the electrical length differences of said cable portions being for the production of the phase step selected at the wave length $\lambda_0/n$, wherein $\lambda_0$ corresponds to the frequency $f_0$.

4. An antenna arrangement according to claim 1, thereby characterized that the required phase shifting is, at phase steps of 180°, effected by change of polarity of the feed lines and terminal points, respectively, and that there are at greater phase angles additionally provided feed cable portions of corresponding length.

5. An antenna arrangement according to claim 1, wherein the radiator elements are spatially displaced relative to the respective principal radiation directions to provide a phase superposing along respective lines bisecting the angle between adjacent principal radiation directions to effect a compensation of the phase shifted feed.

6. An antenna arrangement according to claim 1, thereby characterized that the principal radiation directions of those of the radiators between which the phase step increases with increasing frequency, mutually embrace a greater angle than the principal radiation directions of radiators at which the phase step decreases with increasing frequency.

7. An antenna arrangement according to claim 1, thereby characterized that the spatial displacement of the radiator elements of the omnidirectional radiator is, for the compensation of disturbances of the radiation diagram caused by differing phase, so effected, that the spacing between the points of radiation concentration of those of the radiators the phase step of which increases with increasing frequency, is greater than that for radiators at which increasing frequency signifies a decrease of the phase step.

8. An antenna arrangement according to claim 5, thereby characterized that the amount of spatial displacement of the radiators is based upon a wave length which corresponds to a frequency lying above the center frequency of the frequency band to be transmitted.

References Cited by the Examiner

UNITED STATES PATENTS 2,808,585 10/1957 Andrew ............ 343—799

FOREIGN PATENTS 832,564 4/1960 Great Britain.

OTHER REFERENCES

RCA Technical Notes, No. 226, RCA Laboratories, Princeton, N.J., Jan. 5, 1959, 343–797.

ELI LIEBERMAN, *Primary Examiner.*

A. R. MORGANSTERN, *Assistant Examiner.*